United States Patent
Halligan et al.

(10) Patent No.: US 10,476,789 B2
(45) Date of Patent: Nov. 12, 2019

(54) SOFTWARE DEFINED NETWORK AND A COMMUNICATION NETWORK COMPRISING THE SAME

(71) Applicant: Openwave Mobility Inc., Redwood City, CA (US)

(72) Inventors: Matt Halligan, Belfast (GB); Patrick McGleenon, Newry (GB)

(73) Assignee: Openwave Mobility Inc., Redwood City, CA (US)

( * ) Notice: Subject to any disclaimer, the term of this patent is extended or adjusted under 35 U.S.C. 154(b) by 87 days.

(21) Appl. No.: 14/991,588

(22) Filed: Jan. 8, 2016

(65) Prior Publication Data

US 2016/0205015 A1    Jul. 14, 2016

(30) Foreign Application Priority Data

Jan. 8, 2015    (GB) .................................. 1500271.0

(51) Int. Cl.
*H04L 12/771*    (2013.01)
*H04L 12/715*    (2013.01)
(Continued)

(52) U.S. Cl.
CPC .......... *H04L 45/56* (2013.01); *H04L 12/6418* (2013.01); *H04L 45/04* (2013.01); *H04L 45/64* (2013.01); *H04L 45/38* (2013.01)

(58) Field of Classification Search
CPC ..... H04L 45/38; H04L 47/2408; H04L 29/06; H04L 45/42; H04L 45/54; H04L 47/14; H04W 72/0493; H04W 88/16
See application file for complete search history.

(56) References Cited

U.S. PATENT DOCUMENTS

2005/0289244 A1    12/2005    Sahu et al.
2013/0144973 A1    6/2013    Li et al.
(Continued)

FOREIGN PATENT DOCUMENTS

WO    2013139298 A1    9/2013
WO    2014028612 A1    2/2014
(Continued)

OTHER PUBLICATIONS

GB Search Report dated Jul. 20, 2015 for Application No. GB1500271.0.

*Primary Examiner* — Mansour Oveissi
(74) *Attorney, Agent, or Firm* — EIP US LLP

(57) ABSTRACT

There is disclosed methods, apparatus, and computer programs relating to a Software Defined Network (SDN) for use in a communication network. The SDN acts as an entity in a first service chain of entities through which a data flow is routable by another SDN in the communication network. The first service chain comprises one or more service applications each for performing a service on data from the data flow at a logical layer in the communication network associated with that service application. The SDN routes data from the data flow received at the SDN through a second service chain comprising one or more SDN service applications. An SDN service application of the second service chain is for performing a service on data from the data flow at a higher logical layer within the communication network than is a service application of the first service chain.

18 Claims, 7 Drawing Sheets

(51) Int. Cl.
    *H04L 12/64*     (2006.01)
    *H04L 12/721*     (2013.01)

(56) References Cited

U.S. PATENT DOCUMENTS

| | | |
|---|---|---|
| 2013/0163426 A1 | 6/2013 | Beliveau et al. |
| 2013/0163427 A1 | 6/2013 | Beliveau et al. |
| 2013/0163475 A1 | 6/2013 | Beliveau et al. |
| 2013/0250770 A1 | 9/2013 | Zou et al. |
| 2014/0233385 A1 | 8/2014 | Beliveau et al. |
| 2014/0334295 A1 | 11/2014 | Guichard et al. |
| 2015/0372904 A1* | 12/2015 | Navon ............... H04L 45/38 709/238 |
| 2015/0381515 A1* | 12/2015 | Mattson ............ H04L 41/145 707/609 |
| 2016/0050140 A1* | 2/2016 | Chinni ............... H04L 47/34 709/242 |
| 2016/0057234 A1* | 2/2016 | Parikh ............... H04L 67/16 709/226 |
| 2016/0127181 A1* | 5/2016 | Li ..................... H04L 41/0806 370/254 |
| 2016/0142285 A1* | 5/2016 | Lee ................... H04L 69/22 370/392 |

FOREIGN PATENT DOCUMENTS

| | | |
|---|---|---|
| WO | 2014055625 A1 | 4/2014 |
| WO | 2015065589 A1 | 5/2015 |

* cited by examiner

Flow Table For SDN Switch S1

| Flow Header | | | | | Action | Stats | |
|---|---|---|---|---|---|---|---|
| SRC | | DST | | PROTO | | Packet No. | t from last match |
| IP | PORT | IP | PORT | | | | |
| A | B | C | D | E | Send to port P1 | U | V |
| F | G | H | I | J | Send to port P2 | W | X |
| K | L | M | N | O | Terminate flow | Y | Z |
| . . . | . . . | . . . | . . . | . . . | . . . | . . . | . . . |

FIG. 1

SOFTWARE DEFINED NETWORK AND A COMMUNICATION NETWORK COMPRISING THE SAME

CROSS-REFERENCE TO RELATED APPLICATIONS

This application claims priority under 35 U.S.C. § 119(a) to UK Patent Application No. 1500271.0, filed on Jan. 8, 2015, the entire content of which is hereby incorporated by reference.

BACKGROUND OF THE INVENTION

Field of the Invention

The present invention relates to a Software Defined Network (SDN) and a communication network comprising the same. In particular, but not exclusively, the SDN is a Layer 7 Software Defined Network.

Description of the Related Technology

Software Defined Networking (SDN) is a networking solution relating to the routing of data across a network comprising programmable switches. A SDN may for example comprise communication links between programmable network switches, for example OpenFlow switches, which route packets across the network according to flow tables associated with each switch. The flow tables of each programmable switch may be defined and/or updated by a SDN controller, which has an overview of the route to be taken by a flow of data packets through the SDN.

A schematic flow table of an exemplary SDN switch S1 is presented in FIG. 1. The exemplary flow table contains a flow header field to identify the flows for which the associated actions in the flow table are defined. In the exemplary flow table of S1, each IP flow is identified by a so called 5-tuple, comprising source IP address (SRC IP) and port number (SRC PORT), destination IP address (DST IP) and port number (DST PORT), and the protocol (PROTO) associated with a flow. The exemplary flow table also comprises an action field for each flow header, for example, to which port number of the switch S1 the associated flow should be forwarded. The flow table may also comprise other fields such as number of packets (Packet No.) received for a given flow and the time (t from last match) since a last match of a given flow header with a received packet, for example in order to identify inactive flows.

If a switch of an SDN receives a flow having a 5 Tuple that is not included in its flow table, one or more of the packets of the flow may sent by the switch to a SDN controller. The SDN controller may then use these packets to decide if the flow should be added to the flow table, and may update the flow table accordingly.

The controller may update the flow table of each switch under its control with the Flow header and action required at each switch in order to route the flow through the network as required. Each switch may have a plurality of entries in its flow table to route different flows to different locations. The switch may take other actions on flows, for example in the third row of the exemplary flow table of FIG. 1, the switch is programmed to terminate any flows with flow header [SRC IP=K, SRC PORT=L, DST IP=M, DST PORT=N, PROTO=O].

It is known that multiple network applications or functions can be configured together to form a so called 'service chain' and a SDN can be configured to route data of a data flow through each application in the service chain in turn.

It is standard to consider a data network as being logically arranged as stack of logical layers (e.g. the very well-known OSI model which has seven logical layers) each layer performing a set of service for the layer above it. To date, in the context of a SDN, the services provided by applications in a service chain are typically limited to Layer 2 (Data-Link Layer), Layer 3 (Network Layer), or Layer 4 (Transport Layer) services such as Deep Packet Inspection (DPI), firewall services or the like.

Increasingly, it is desirable to provide Layer 7 (Application Layer) applications in service chains in a SDN.

SUMMARY

In a first embodiment of the invention, there is a communication network comprising: a first Software Defined Network (SDN); and a second SDN; wherein, the first SDN is configurable to route data from a data flow through a selectable sequence of one or more entities defining a first service chain, wherein the entities defining the first service chain are selectable from one or more first SDN service applications and the second SDN; wherein each of the one or more first SDN service applications is for performing a service on data from the data flow at a logical layer within the communication network and wherein the second SDN is configurable to route data from the data flow received at the second SDN when the second SDN is one of the entities in the first service chain through a second service chain comprising one or more second SDN service applications, wherein each of the one or more second SDN service applications is for performing a service on data from the data flow at a higher logical layer within the communication network than is each of the one or more first SDN service applications.

In a second embodiment of the invention, there is a Software Defined Network (SDN) for use in a communication network, wherein the SDN is configurable to act as entity in a first service chain of one or more entities through which a data flow is routable by another SDN in the communication network, wherein the first service chain comprises one or more service applications each for performing a service on data from the data flow at a logical layer in the communication network associated with that service application and wherein the SDN is further configurable to route data from the data flow received at the SDN through a second service chain comprising one or more SDN service applications, wherein at least one of the one or more SDN service applications of the second service chain is for performing a service on data from the data flow at a higher logical layer within the communication network than is at least one of the one or more service applications of the first service chain.

In a third embodiment of the invention, there is a non-transitory computer-readable storage medium comprising computer-executable instructions which, when executed by a processor, cause a computing device to perform a method of operating a Software Defined Network (SDN) in a communication network, the method comprising: configuring the SDN to act as entity in a first service chain of one or more entities through which a data flow is routable by another SDN in the communication network, wherein the first service chain comprises one or more service applications each for performing a service on data from the data flow at a logical layer in the communication network associated with that service application; and configuring the SDN to route data from the data flow received at the SDN through a second service chain comprising one or more SDN service applications, wherein at least one of the one or more SDN service applications of the second service chain is for performing a service on data from the data flow at a higher logical layer within the communication network than is at least one of the one or more service applications of the first service chain.

Further features and advantages of the invention will become apparent from the following description of embodiments of the invention, given by way of example only, which is made with reference to the accompanying drawings.

BRIEF DESCRIPTION OF THE DRAWINGS

FIG. 1 shows a schematic illustration of an SDN flow table;

DETAILED DESCRIPTION OF CERTAIN INVENTIVE EMBODIMENTS

Figure 2:
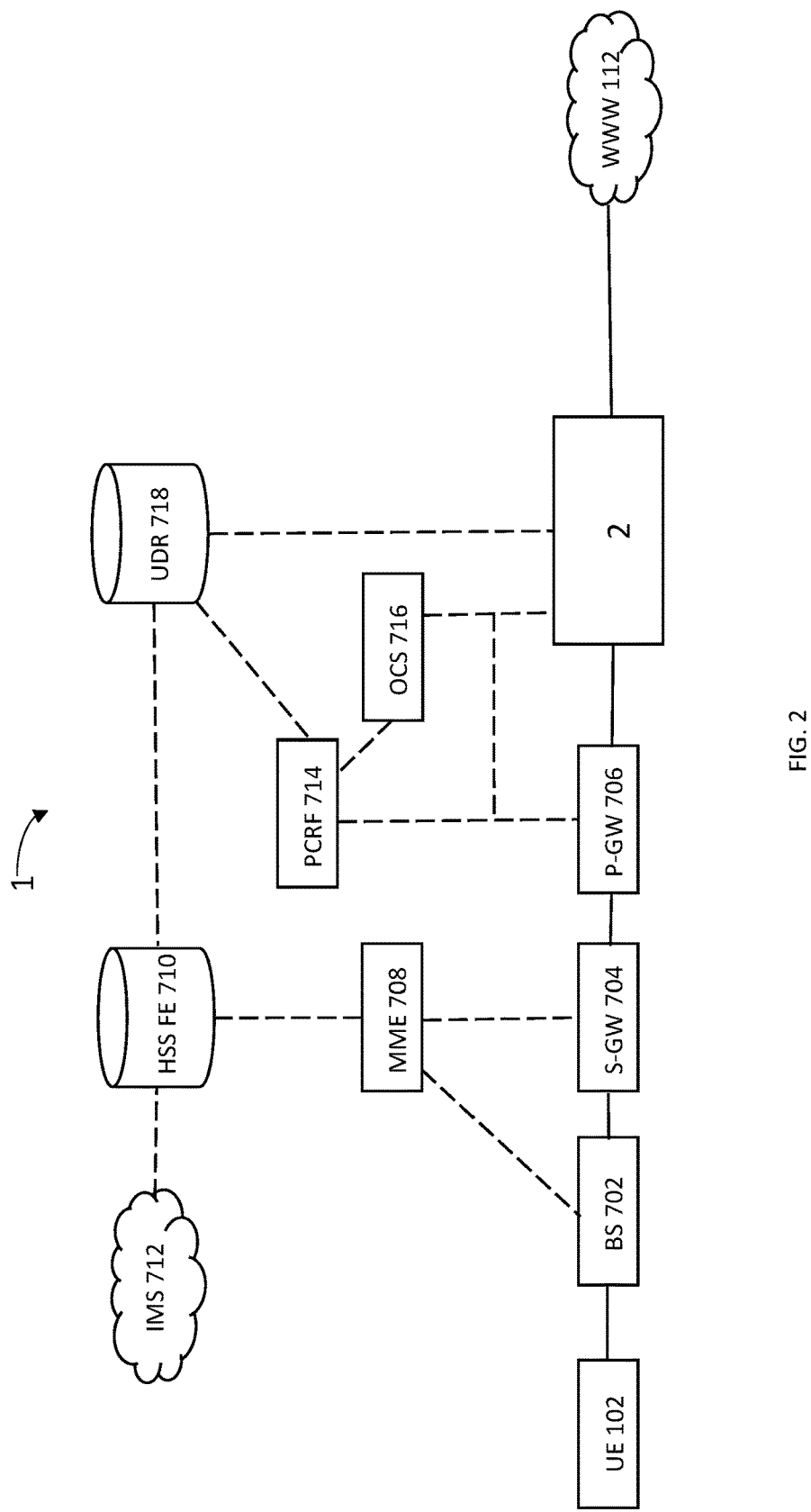
FIG. 2 shows a schematic illustration of a network according to one or more embodiments of the present invention.

FIG. 2 is a schematic diagram of an exemplary system 1 in which some of the embodiments of the invention may be implemented. In the example shown in FIG. 2, system 1 comprises components of a 3rd Generation Partnership Project (3GPP) mobile network architecture to connect User Equipment (UE) 102 to the Internet (WWW) 112.

The UE 102 may be, for example, a handheld wireless device, such as a cell phone, a mobile phone, a smartphone, a pad computer, a Personal Digital Assistant (PDA), a handheld gaming device etc., which can wirelessly communicate using radio frequency (RF) communications signals. The UE 102 can support various different RF communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the 3rd Generation Partnership Project (3GPP) or the 3rd Generation Partnership Project 2 (3GPP2), 4G Long Term Evolution (LTE) and IEEE 802.16 standards bodies. Although some wireless communications protocols are identified herein, it should be understood that the present disclosure is not limited to the cited wireless communications protocols.

The UE 102 may send Hypertext Transfer Protocol (HTTP) requests over a Transmission Control Protocol (TCP) connection to content providers (not shown) within WWW 112.

In some embodiments, WWW 112 may comprise a content provider (not shown) to store, for example, media content, to process requests for media content from UE 102, and to stream requested media content to UE 102 over at least one streaming protocol. The content provider may store video content and/or non-video content such as text files, webpage files, image files, audio files, or any combination thereof. In an embodiment, the media content stored in the content provider is encoded, which includes compression. For example, the content provider may include a content encoder (not shown) to encode original video content or include a content database (not shown) that stores pre-encoded media content. The content provider may serve media content over a single transport protocol or more than one transport protocol. In an embodiment, the content provider serves video content over HTTP such as HTTP-Adaptive Streaming (HTTP-AS) and/or real time streaming protocol (RTSP) or other similar protocols. The content source may be an HTTP server.

The components of the 3GPP mobile network architecture shown in FIG. 2 may comprise a Base Station (BS) 701 connected to the UE 102, which, via Serving Gateway (S-GW) 702 and Packet Data Network Gateway (P-GW) 706 provides connectivity for the UE 102 to the Internet, i.e. WWW 112. The BS 702 and S-GW 704 are in communication with Mobility Management Entity (MME) 708, which controls the UE 102 connection to the mobile network. The MME 708 in turn is in communication with Home Subscriber Server Front End (HSS-FE) 710, the HSS comprising a database for the mobile network to store user-related and subscription related information for use in, for example, mobility management. The HSS-FE 710 may also be in communication with, for example IP Multimedia Subsystem (IMS) 712, which may facilitate the provision of IP multimedia services to UE 102. The P-GW 706 may be in communication with a Policy and Charging Rules Function (PCRF) 714 which may, for example, make policy decisions relating to a subscriber of UE 102. The PCRF 714 is in turn in communication with User Data Repository (UDR) 718 which may store any information relating to a user, from which, for example the PCRF 714 can obtain user data with which to inform policy decisions. The HSS FE 710 may also be in communication with the UDR 718. System 1 may also comprise, between P-GW 706 and WWW 112, Software Defined Network (SDN) system 2, which will be described in more detail below. SDN system 2 may be, for example, in communication with PCRF 714, which communication may also be via, for example, Online Charging System (OCS) 716, to provide SDN system 2 with, for example, policy and charging information relating to a user of the UE 102.

SDN system 2 may also be in communication with UDR 718, which may, for example, provide SDN system 2 with data relating to a user of the UE 102.

SDN system 2 may process requests and responses between UE 108 and WWW 112 to provide services on them as described in more detail below.

Figure 3:
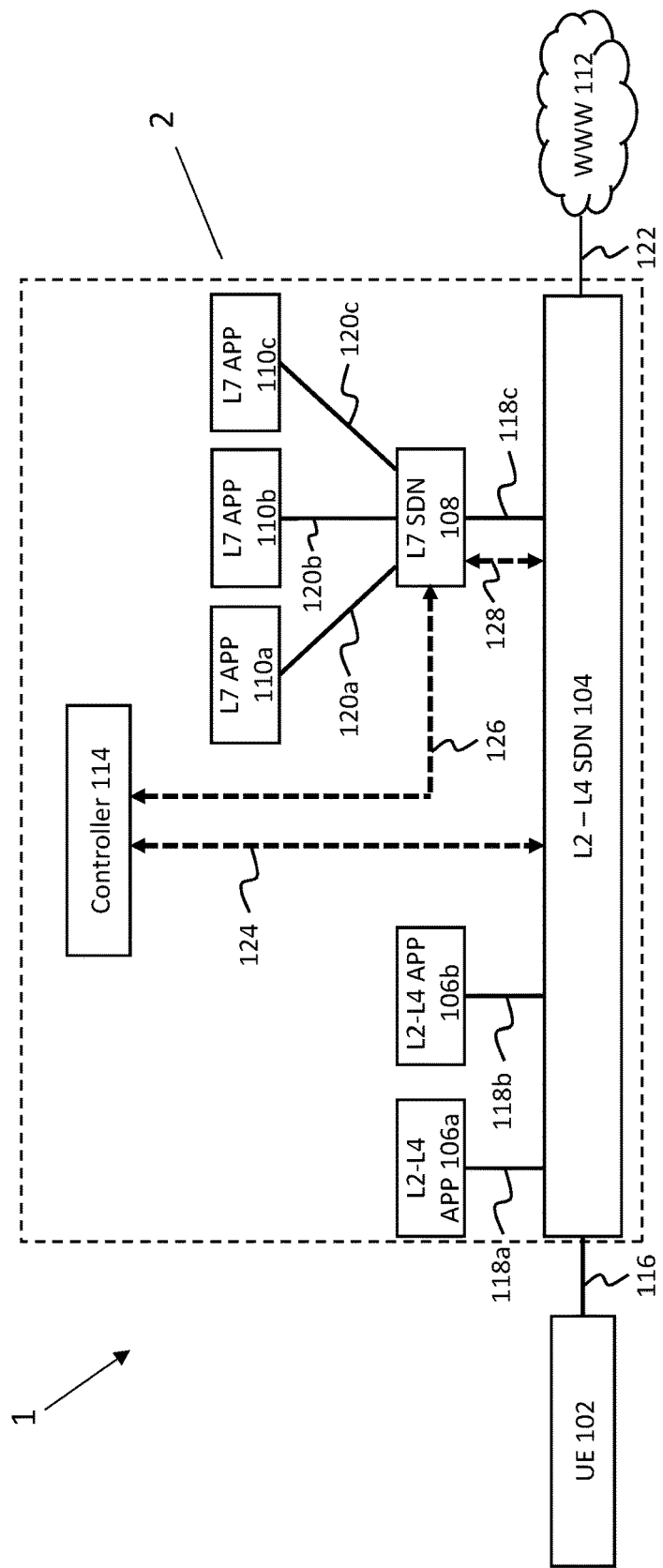
FIG. 3 shows a schematic illustration of a network.

FIG. 3 is a simplified schematic diagram of system 1 only showing UE 102, SDN system 2, and WWW 112 for simplicity.

In FIG. 3, the UE 102 is communicatively connected to the SDN system 2 by connection 116.

At a logical level, the SDN system 2 comprises a Layer 2 to Layer 4 Software Defined Network (L2-L4 SDN) 104, a plurality of L2-L4 applications 106a-106b, a Layer 7 SDN 108 and a plurality of L7 applications 110a to 110c. A controller 114 is provided for controlling the L2-L4 SDN 104 and the L7 SDN 108.

Data flows from the UE 102 to the WWW 112 (and vice versa) are routed through the network 2.

The L2-L4 SDN 104 is configurable to route data from such a data flow through a selectable sequence of one or more entities defining a first service chain and which entities are selectable from the plurality of L2-L4 applications 106a to 106b and the L7 SDN 108.

The L2-L4 SDN 104 may for example comprise communication links between programmable network switches (not shown), for example OpenFlow switches, which route packets across the network according to flow tables associated with each switch. The flow tables of each programmable switch may be defined and/or updated by the controller 114, which has an overview of the route to taken by a flow of data packets through the L2-L4 SDN 104. The controller 114 may communicate with policy functions (not shown in FIG. 3) such as OCS 716 and/or PCRF 714 shown in FIG. 2, such that controller 114 may implement policies obtained from such sources. The controller 114 translates the obtained policies into SDN policies that may be implemented on the L2-L4 SDN 104, which may for example, comprise defining service chains through which certain data should be routed. The controller 114 may communicate with the L2-L4 SDN 104 (for example with each switch of the SDN) by a communication channel 124. This channel 124 may comprise, for example, a secure control channel separated from the connections used for the data flow. In some examples, channel 124 may communicate data of the routed data flow, for example if a switch of the SDN 104 receives a flow not included in its flow table, one or some packets of the flow may be delivered to the channel 124, where they may be encapsulated and sent to the controller 114. The controller 114 may then use these packets to decide if the flow should be added to the flow table, and may update the flow table accordingly using channel 124.

The L2-L4 SDN 104 may be connected to the internet, or World Wide Web (WWW) 112, which may contain content servers or the like which may provide data to the UE 102 through the SDN system 102, by connection 122.

The L7 SDN 108 may be communicatively connected to the controller 114 via channel 126, which may, for example comprise a secure control channel, and may communicate control data and/or packets of the flow to the controller 114.

The L7 SDN 108 may also be communicatively connected to the L2-L4 SDN 104 via a control channel 128, for example for communicating control data to the programmable switches of the L2-L4 SDN 104, or network functions connected thereto.

Each of the L2-L4 applications 106a to 106b is for performing a given service for the data it receives that service being provided within Layer 2, Layer 3 or Layer 4, as the case may for a given application.

The L7 SDN 108 is configurable, so that, when it is an entity in a first service chain, it routes data from the data flow through a second service chain comprising one or more of the L7 applications 110a to 110c.

Each of the L7 applications 110a to 110c is for performing a given service for the data it receives, that service being provided within Layer 7. Examples of Layer 7 applications include, inspection of HTTP (L7) headers, inspection of L7 payload such as Video and Web Objects, modification of payload or headers (e.g. optimization services) and authentication of the User-Agent accessing the network.

It should be appreciated that the data of a data flow that is routed to and from a given application in a given service chain may comprise meta-data associated with a given flow (e.g. header data of packets in a flow) or payload data associated with the flow (e.g. the payload of packets in the flow) or combinations of both. Moreover, the data of a data flow routed to and from applications in a given service chain may be different for different applications in that given service chain depending upon the particular services that the different applications provide. So for example, one application in a service chain may receive only meta data while another application in the service chain may receive meta data and payload data.

Accordingly, with this arrangement, from the perspective of the L2-L4 SDN 104, the L7 SDN 108 is effectively another L2-L4 App that may (or may not be) be part of a service chain that the L2-L4 SDN is configured to route data from a data flow through. As the L7 SDN 108 is configurable to route data from a data flow through a service chain of L7 applications, there is no requirement that the L2-L4 SDN 104 itself to be programmed to direct data from any data flow to specific L7 applications thus allowing the configuration of the L2-L4 SDN 104 to be kept relatively simple. Moreover, as will explained with reference to an example below, the L7 SDN 108 can obtain and make use of high level policy information in order to select a service chain of appropriate L7 applications for a given data flow. This would be difficult to implement using the standard 5-tuple based flow tables of the L2-L4 SDN 104.

The L7 SDN 108 may send a control signal to the L2-L4 SDN 104 to instruct the L2-L4 SDN 104 to remove the L7 SDN 108 from a first service chain when the L7 SDN 108 is one of the entities in the first service chain, so that mid-flow of data from a data flow through the first service chain, the first data flow is caused to by-pass the L7 SDN 108.

The L7 SDN 108 may be arranged to send such a signal to the L2-L4 SDN 104 in response to determining that all of the one or more L7 applications 110a to 110c in the second service chain have completed their services for the data flow.

The L7 SDN 108 may be arranged to send the signal to the L2-L4 SDN 104 in response to determining that one or more resource usage criteria of the L7 SDN 108 have been reached.

The L7 SDN 108 may send the signal over the control channel 128.

The applications or services implemented in a given service chain (either one of the L2-L4 SDN 104 or one of the L7 SDN 108) may also be dependent on the direction of the flow, for example, a flow associated with a request from a UE 102 to the WWW 112 may have applied to it different services, or services in a different order, to a flow associated with a corresponding response from the WWW 112 to the UE 102. The L2-L4 applications 106a and 106b and the L7 applications 110a to 110c may, for example, be implemented on physical devices in the network as so called Physical Network Functions, or as Virtualized Network Functions (VNF) implemented as software or applications running on standardized servers in the network.

In the example of FIG. 3, the L2-L4 SDN 104 is connected with the two Layer L2-L4 applications 106a and 108b via connections 118a and 118b respectively.

The L2-L4 SDN 104 is connected, via connection 118c, to the Layer 7 SDN (L7 SDN) 108.

The L7 SDN 108 may, for example, be implemented as software on a server. The L7 SDN 108 is connected to the Layer 7 applications (L7 APP) 110a, 110b, and 110c via connections 120a, 120b, and 120c respectively.

Figure 4:
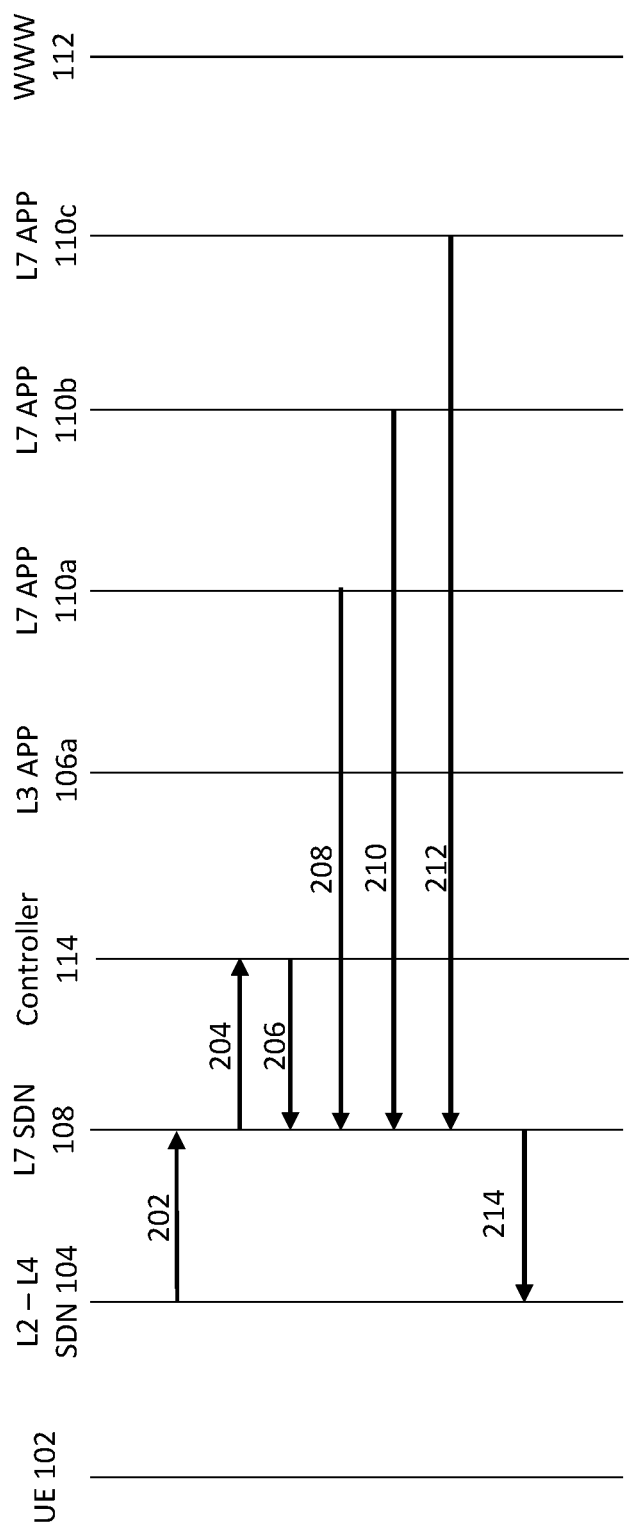
FIG. 4 shows a signaling diagram for an initialization process according to one or more embodiments of the present invention.
Figure 5:
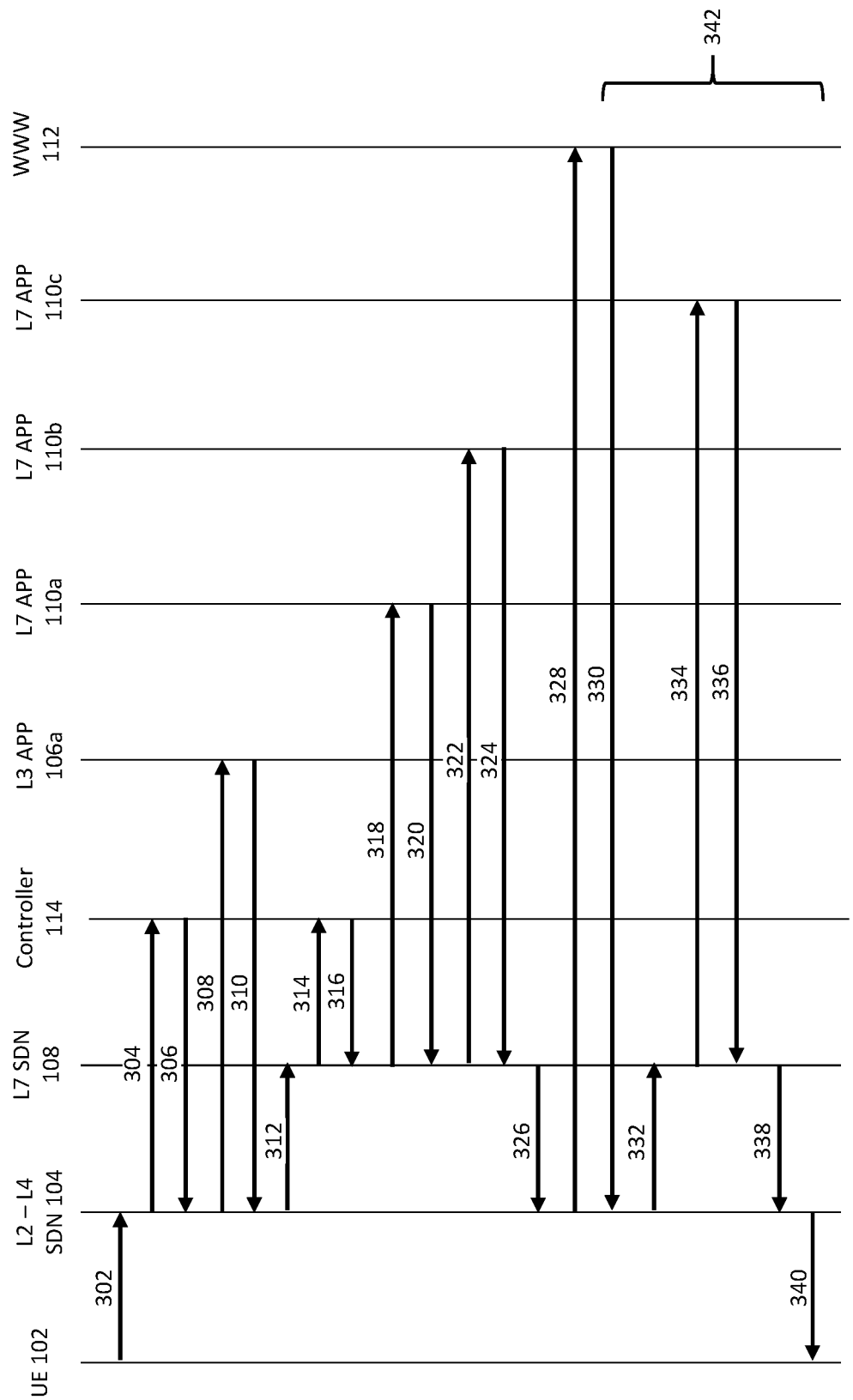
FIG. 5 shows a signaling diagram between elements in an exemplary network according to one or more embodiments of the present invention.
Figure 6:
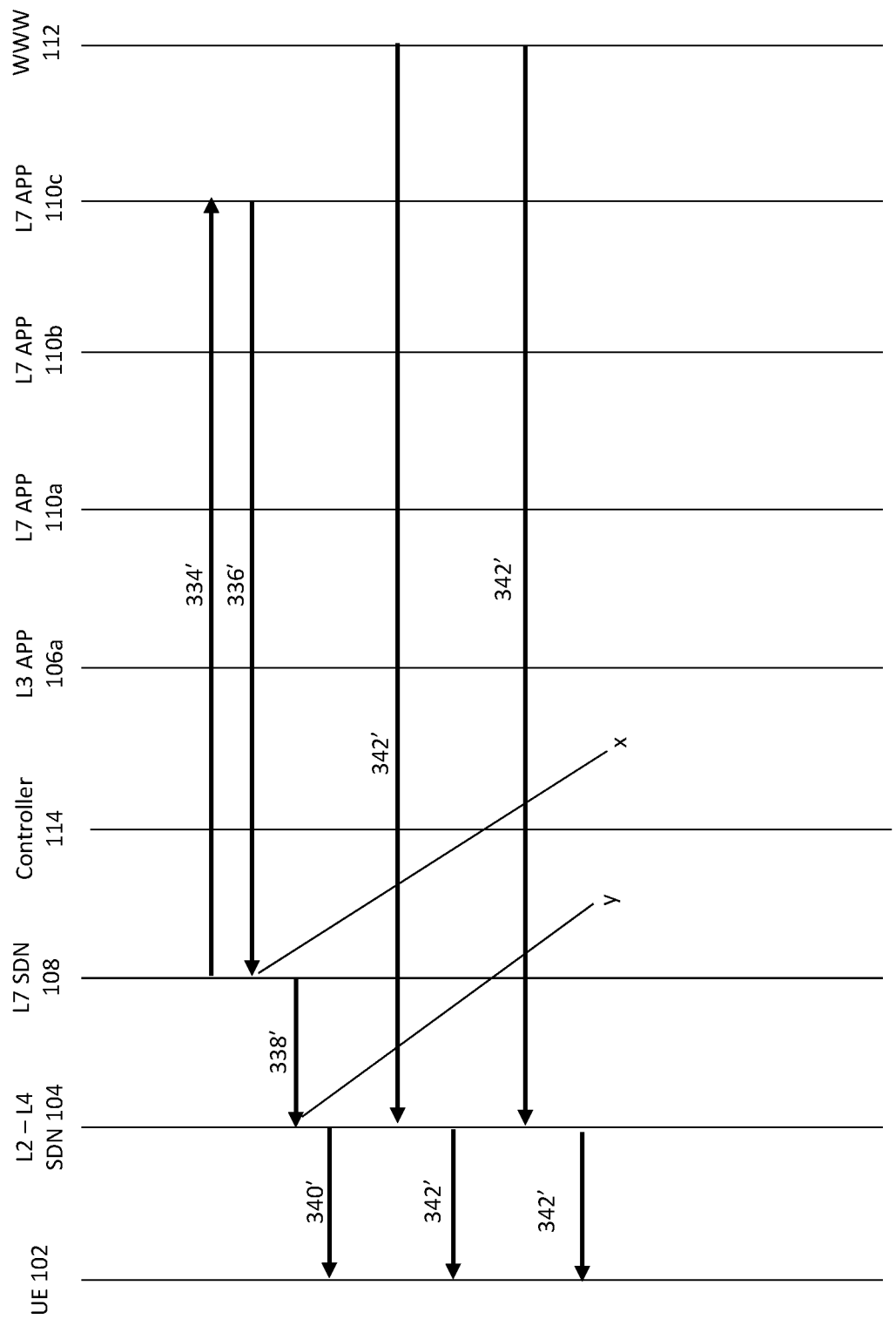
FIG. 6 shows a signaling diagram between elements in an exemplary network according to one or more embodiments of the present invention.

Referring now to FIGS. 4 to 6, an example of an embodiment of the invention will be described in more detail.

FIG. 4 is an exemplary schematic diagram showing signaling between some of the components shown in FIG. 3 during an initialization procedure of the L7 SDN 108.

The L2-L4 SDN 104 registers with the L7 SDN 108 by sending a registration message 202. The registration message 202 informs the L7 SDN 108 that the L2-L4 SDN 104 is arranged so that the L7 SDN and can interface directly with the L2-L4 SDN 104 on a control plane. The L7 SDN 108 may, for example, be configured to listen for the registration message 202 on a certain port, for example, Port 881. In response to the L7 SDN 108 receiving the registration message 202 it establishes the, for example, TCP based, control channel 128 with the L2-L4 SDN 104.

Next, the L7 SDN 108 SDN initializes with the controller 114 via message 204, to request that the controller 114 inform it of the L7 applications to be provisioned. The controller 114 retrieves and maintains an up to date list of L7 applications available and their capabilities from a policy element with which the controller 114 is in communication (e.g. PCRF 714 or OCS 716 of FIG. 2). As described above, the controller may translate received policy information into service chains comprising L7 applications, and hence may determine which L7 applications may be needed in order to implement service chains required to implement the policy.

The controller 114 replies, with message 206, informing the L7 SDN 108 the services to be provisioned.

Next, the L7 applications 110a, 110b, and 110c themselves send initialization messages 208, 210 and 212 respectively to the L7 SDN 108 indicating that they are ready to be invoked if needed, and comprising information indicating an identity of the application, details of its function, the services it is able to implement, and any additional capabilities that it may require in order to carry out one or more of its functions. Then, the L7 SDN 108 determines which of the L7 applications 110a, 110b, and 110c to register into the L7 SDN 108. If the L7 SDN 108 registers an application then the application's service chain definitions are included in the L7 SDN 108 so that the L7 SDN 108 can subsequently route a data flow to that application for processing by the application. The L7 SDN 108 may indicate to each of the L7 applications 110a, 110b, and 110c whether or not it has been registered.

The L7 SDN 108 then sends an acknowledgement message 214 to the L2-L4 SDN 104 to inform it that the L7 SDN 108 is available as entity that the L2-L4 SDN 104 can route data of a data flow to.

FIG. 5 is an exemplary schematic signaling diagram depicting traffic flow and/or signaling between some of the network components of FIG. 3 during an exemplary request for and receipt of data by a UE 102 from the WWW 112 via the L2-L4 SDN that has undergone an initialization procedure as described above.

First, the UE 102 sends a request 302 for content at a content server (not shown) located in the WWW 112, the request being received by the SDN 104, for example at a switch of the L2-L4 SDN 104. The request 302 may for example be a Hyper Text Transfer Protocol (HTTP) request sent over a Transport Control Protocol/Internet Protocol (TCP/IP) connection.

The L2-L4 SDN 104 inspects one or more packets of the request to identify the 5-Tuple for the flow associated with the request and determines whether or not it has a flow table entry for that 5-Tuple. In this example, the flow associated with the request 302 is not contained in a flow table of the L2-L4 SDN 104 at which it is received and so, at this point, the L2-L4 SDN 104 is not programmed to route the request data flow through a service chain in the L2-L4 SDN 104.

Accordingly, the L2-L4 SDN 104, for example using a switch within the L2-L4 SDN, forwards one or more of the flow's initial data packets to the controller 114, as represented by signal 304 in order for the controller 114 to determine (a) an appropriate service chain in the L2-L4 SDN 104 for the request data flow to pass through en route from the UE 102 to the WWW and (b) an appropriate service chain in the L2-L4 SDN 104 for a response data flow (i.e. a response sent from the WWW back to the UE 102 in response to the request) to be routed through when being returned from the WWW to the UE 102.

The controller 114 may determine the appropriate service chains based on (i) 5-tuple information (e.g. source IP address and port number, destination IP address and port number, and the protocol in use) derivable from the received packets; (ii) contextual/policy information associated with the UE 102 or a subscriber account of the user of the UE 102; (iii) a set or pre-configured routing rules' (iv) combinations of (i) to (iii).

The controller 114 may derive contextual information associated with the flow in a number of ways. In one example, the controller 114 may first authenticate the request data flow using the known Remote Authentication Dial In User Service (RADIUS). The controller 114, may, for example, provide a RADIUS server (not shown) with the source IP address of the data flow (i.e. the IP address assigned to the UE 102). The RADIUS server maintains a database mapping IP addresses that have been assigned to UEs to unique identifiers of those UEs (for example, IMEIs of the UEs or other such unique identifier).

In response to the query from the controller 114, the RADIUS server confirms to the controller 114 whether or not the data flow is authorized (for example that there is valid service plan associated with the data flow).

If the data flow is authorized the RADIUS server returns to the controller 114 a unique identifier of that UE 102. The controller 114 uses the unique identifier as index into a subscriber policy database (not shown) that maps each UE unique identifier to policy information applicable for that UE. For example, the policy information may comprise a set of one or more policies that depend upon the level of service plan that the user of the UE 102 has subscribed to. In this way, different policies may be applicable depending upon whether the subscriber is a High level (Platinum) subscriber, Medium Level (Gold) or low level (Bronze) subscriber.

In a further example, the controller 114 may interact with a Packet Gateway (e.g. P-GW 706 of FIG. 2) to authenticate the data flow and the Packet Gateway may interface with a Policy and Charging Rules Function (PCRF) node (e.g. PCRF 714 of FIG. 2) to obtain the Unique Identifier of the UE 102 and policy information relevant to the UE 102 which are then passed to the controller 114. In other examples, the controller may query a PCRF node directly with the source IP address of the UE 102 in order to obtain the Unique Identifier of the UE 102 and policy information relevant to the UE 102.

The controller 114 may then determine, for example, based on the 5 Tuple information derived from packets of the data flow, the policy information it has obtained, and any pre-determined rule set, a service chain to be applied to the request data flow and a service chain to be applied to a response data flow.

For the purposes of this example, controller 114 determines that the sequence of end points for the service chain for the request flow is the L3 APP 106a (for example, a firewall) followed by the L7 SDN 108 and that the sequence of end points for the service chain for the response flow comprises only the L7 SDN 108.

The controller 114, with signal 306, programs the L2-L4 SDN 104 to route the data from the request data flow and data from the response data flow in accordance the determined request service chain and response service chain accordingly. This is achieved by providing suitable updates or additions to the flow tables of the switches of the L2-L4 SDN 104. That is to say, the flow charts in the switches in the L2-L4 SDN 104 are configured so that data from the request data flow is routed first to the L3 App 106a and when returned from the L3 App 106a to the L7 SDN 108 and when returned from the L7 SDN 108 onwards to the WWW. Similarly, the flow charts in the switches in the L2-L4 SDN 104 are configured so that data from the corresponding response data flow when received at the L2-L4 SDN 104 is routed to the L7 SDN 108 and when returned from the L7 SDN 108 is then routed onwards to the UE 102.

Accordingly, as indicated by 308, the L2-L4 SDN 104 then routes data of the request data flow to the L3 APP 106a. The L3 APP 106a performs its service on the data of the request data flow, for example a firewall service, and returns the data of the request data flow back to the L2-L4 SDN 104 as indicated by 310.

The L2-L4 SDN 104 then routes, as indicated by 312, data of the request data flow to the next service in the request service chain which in this example is L7 SDN 108.

The L7 SDN 108 receives the data of the request data flow and (a) establishes a service chain of the L7 applications that are to be applied data of the request data flow and (b) establishes a service chain of the L7 applications that are to be applied to data of the response data flow. In each case, the service chain of L7 applications defines which of the L7 applications are to be applied to data of the request data flow or data of the response data flow, as the case may be, and in what order.

To that end, the L7 SDN 108 identifies the 5 tuple information from data of request data flow and sends, as indicated by 314, a request to the controller 114, for policy information associated with that 5 tuple information. The controller 114 responds, as indicated by 316, with the policy information.

This information may comprise the unique identifier of the UE 102 and the policy information relevant to the UE 102 obtained by the controller 114 earlier and hence may be retrieved by the controller 114 from a cache (not shown).

The L7 SDN 108 then determines, for example, based on the 5 Tuple information, the policy information, and any pre-determined rule set a L7 service chain to be applied to data of the request data flow and a L7 service chain to be applied to data of the response data flow.

For the purposes of this example, the L7 SDN 108 determines that the sequence of L7 end points for the L7 service chain for the request flow is the L7 App 110a, followed by the L7 App 110b and that the sequence of L7 end points for the L7 service chain for the response flow comprises only the L7 App 110c.

Once the L7 SDN 108 determines which L7 applications to direct data of the request flow to, returning to FIG. 5, the L7 SDN 108 accordingly routes data of the request flow to L7 APP 110a as indicated by 318, which, after implementation of its service, returns the data of the request flow to the L7 SDN 108 as indicated by 320.

Next, the L7 SDN 108 further routes data of the flow to L7 App 110b as indicated by 322, which, after implementation of its service, returns the data of the request flow to the L7 SDN 108 as indicated by 324.

After the L7 SDN 108 determines that data of the request flow has passed through all of the L7 applications determined to be required to implement a service definition for that flow, it returns the request flow, as indicated by 332, to the L2-L4 SDN 104. The L2-L4 SDN 104 then, according to the service chain, routes the request flow to WWW 112, and the request from the UE 102 to WWW 112 is completed.

It should be noted that subsequent flows from the UE 102 to the L2-L4 SDN 104 (e.g. signal 302) may be contained in the flow tables of the switches of the L2-L4 SDN 104, and so signals 304 and 306 between the SDN 104 and the controller 114 may not occur. Similarly, the signals 314 and 316 between the L7 SDN 108 and the controller 114 may not occur for subsequent flows for which the L7 SDN 108 already has valid contextual information relating to the flow, for example, a valid entry in the service table of the L7 SDN 108. This information may, for example, have a Time To Live (TTL), or other validity conditions associated with it, and on expiry, updated information may be requested by L2-L4 SDN 104 or the L7 SDN 108 from the controller 114.

In some examples, a L7 application may be passed only metadata associated with the flow, and not necessarily the payload data of flow itself. For example an authentication application may only identify a flow and determine whether the flow is authorized to be passed on to a further application.

In an example, the request might be related to a specific domain, and an implementation of an abstract service definition at the L7 SDN 108 requires that, for requests specifying that domain, certain information is to be added to the header of the packets of the flow, which, for example, may be encrypted.

In an example, a L7 application may require to be passed all of the data of the flow (e.g. meta-data and payload data), and will return updated data after it has implemented its function.

In an example, a L7 application may determine that an element of the request of the request flow is not authorized, or may not be implemented for the abstract service plan associated with the UE 102 from which the request originated. In this example, the application may terminate or redirect the flow to, for example, a payment server.

Returning to the signaling diagram of FIG. 5, once the request 328 is received by the WWW 112 from the L2-L4 SDN 104, the WWW 112 may return a response flow 330 in accordance with the request to the L2-L4 SDN 104. In this example, the response flow 330 may comprise, for example, video content from a video content server situated in the WWW 112. This response flow has its own 5-tuple related to the 5-Tuple of the request flow (e.g. the Source IP address and Port of the request flow are the Destination IP address and Port of the response flow, the Destination IP address and Port of the request flow are the Source IP address and Port of the response flow, and the Protocol are the same for both).

The L2-L4 SDN 104 receives the response flow 330 and routes the response flow according to the previously determined L2-L4 response service chain. In the example of FIG. 5, this results in data of the response flow being forwarded to the L7 SDN 108 as indicated by 332.

In turn, the L7 SDN 108 identifies the response flow based on its 5 tuple and routes data of the response flow through the L7 service chain it previously determined.

In this example, the response flow L7 service chain comprises the L7 APP 110c only, which performs its function and returns data of the response flow to the L7 SDN 108 as indicated by 336. The L7 App 110c may for example, be a Video Optimization (VO) service which optimizes the response flow, for example, performing additional compression, for transmission to the UE 102.

The L7 SDN 108, having determined that there it is not required to forward the response flow to any further L7 applications, returns the response flow to the L2-L4 SDN 104 as indicated by 338.

The L2-L4 SDN 104, routes the response flow to the UE 102 as indicated by 340.

It may be that at some point during the response flow, L7 APP 110c is no longer required, for example, its function has been completed or conditions have changed such that it is no longer required in the service chain of the response flow.

The response flow may therefore continue to be routed via the L7 SDN 108 and L7 APP 110c even in the case where the L7 APP 110c had completed its function on the flow. This may result, for example, in an inefficient use of the L7 application resources and unnecessary signaling to be perpetuated for the lifetime of the response flow.

Advantageously therefore, as already described above, a procedure is provided whereby if, mid-flow of a given flow, the L7 SDN 108 determines that it should be removed from a service chain of the L2-L4 SDN, then it can instruct the L2-L4 SDN 104 to remove it.

An example is illustrated in FIG. 6. As indicated by 334', the L7 SDN 108 sends to the L7 App 110c data of a response data flow that is being sent from the WWW 112 to the UE 102 and has been received at the L2-L4 SDN 104 and forwarded from there to the L7 SDN 108.

The L7 App 110c performs its function on the data of the response data flow and starts returning it to the L7 SDN 108 as indicated by 336', which in turn starts sending the data flow to the UE 102 as indicated by 340'. At the point indicated by X, the L7 App 110c determines that, despite the response data flow being in mid flow, its service for the response data flow is complete and it communicates this information to the L7 SDN 108. This information may be communicated with the response flow itself (e.g. in band signaling), for example encapsulated in the packets of the flow, or via a separate control plane (out of band signaling) between the L7 APP 110c and the L7 SDN 108 (not shown).

At the point indicated by box Y, the L7 SDN 108 determines that no further L7 processing by any of the available L7 Apps is required and signals to the L2-L4 SDN that the L2-L4 SDN should remove the L7 SDN 108 from the service chain for that response flow.

As mentioned previously, the L7 SDN 108 may communicate this information directly to the L2-L4 SDN 104 via the dedicated control channel 128 (e.g. out of band signaling) (see FIG. 3). Alternatively, the L7 SDN 108 may communicate this information to the L2-L4 SDN using in band signaling, for example, by encapsulation in one or more packets of the response flow, for example in Differentiated Service Code Point (DSCP) bits, or in Traffic class, flow label or extension headers in IPv6.

The L2-L4 SDN 104 on receiving this information, removes the L7 SDN 108 from the service chain and updates the flow tables of the switches of the L2-L4 SDN 104 that subsequent packets of response flow 342' to will bypass the L7 SDN 108.

Thereafter, when subsequent packets of the response flow, as indicated by multiple arrows 342', are received by the L2-L4 SDN 104 from the WWW 112 and by-pass the L7 SDN 108, and routes the packets instead to the UE 102 in accordance with its updated service chain. The response flow will continue in this way until the last packet of the response flow has been sent to the UE 102 or the flow is otherwise terminated.

In some examples, the L7 SDN 108 may instruct the L2-L4 SDN 104 to bypass the L7 SDN 108 in response to a determination that the L7 SDN 108 (or one of its APPs) has reached an operating threshold and cannot effectively process further flows. For example, there may be a predefined set of resource thresholds, for example of compute, memory, and availability, which if crossed will result in the bypassing of the L7 SDN 108.

In some examples, information obtained by one or more of the L2-L4 applications 106a to 106b when providing a service for data of a data flow in a given service chain can be provided to the L7 SDN 108. For example, an L2-L4 application that provides a Deep Packet Inspection (DPI) service on data of a data flow may provide information that indicates the 'classification' of payload data of the flow as classified by the DPI (e.g. indicating that the DPI has classified the payload data as being of a particular type e.g. video data and/or peer to peer data etc.). The L7 SDN 108 can then take account of that information when configuring or modifying a service chain of the L7 applications 110a to 110c. For example, when the L7 SDN 108 is part of the same service chain through which data of that data flow is passing (or will pass), the service chain of L7 applications that the L7 SDN configures for data of that data flow may depend upon the information or may be modified depending upon that information. In a further example, the information may be obtained by an L2-L4 App providing a service for data of a data flow associated with a request for content from the WWW 112 and the information may be used by the L7 SDN 108 when configuring a service chain of L7 applications 110a to 110c for providing services for data of a data flow associated with a response to that request.

The information may be provided to the L7 SDN 108 using in band signaling (e.g. included in data packets of the data flow) or over the out of band control channel 128.

In some examples, information obtained by one or more of the L7 Apps 110a-110c when providing a service for data of a data flow in a given service chain can be provided to L2-L4 applications and/or L7 applications that are downstream of the L7 App in the service chain. For example, an L7 App 110a of a given service chain may determine that the packets of a given data flow passing through it contain High Definition (HD) video content. On such a determination, the L7 App 110a may insert into one or more packets of the data flow an indication, for example using a custom header field, that the packets contain HD video content. Alternatively, the L7 App 110a may signal to the L7 SDN 108 that the packets contain HD video content, and the L7 SDN 108 may then itself insert such an indication into the packets of the data flow, for example, when the packets are returned to it from L7 App 110a. The modified packets may then be routed, for example by L7 SDN 108, to the next application defined in the service chain, which may be, for example, a L7 App 110b or 110c, or may be, for example a L2-L4 App. In an example, an L7 App, say L7 App 110b, downstream in the service chain may, for example, inspect the custom header field and determine immediately that the packets contain HD video content. The downstream L7 App 110b may, however, be configured such that it does not perform a service on packets of a data flow containing HD video content, and so may then decide to signal to the L7 SDN 108 immediately that it has completed its service and that it is to be taken out of the service chain. In such a way, L7 Applications of a service chain may communicate information to other applications downstream directly, and may, as a result, dynamically influence the service chain.

Figure 7:
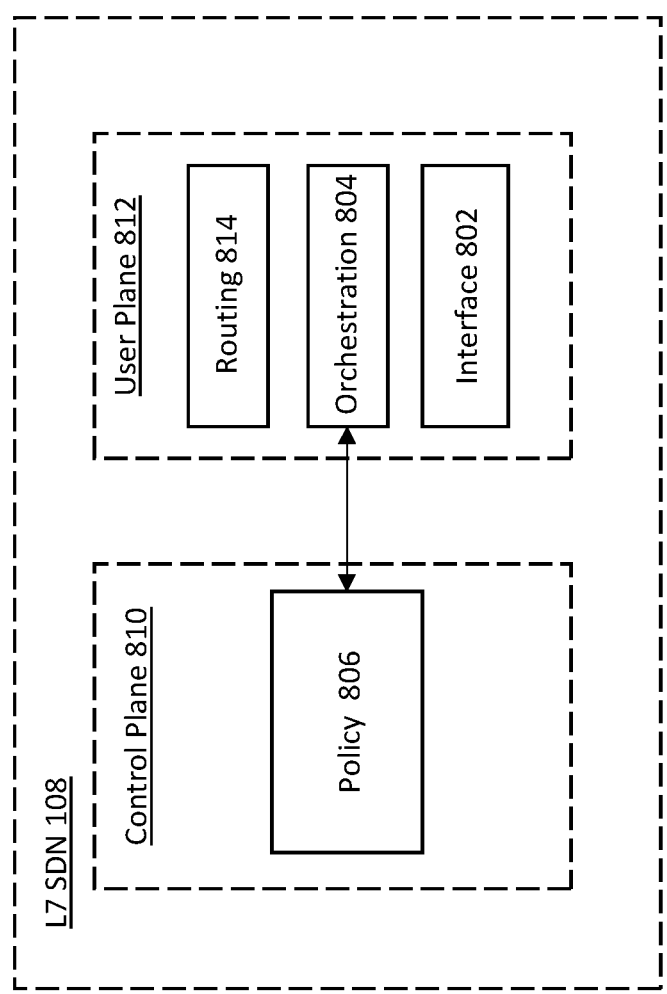
FIG. 7 shows a schematic illustration of a network according to one or more embodiments of the present invention.

FIG. 7 shows logically components of a L7 SDN 108 according to an example. The L7 SDN 108 comprises control plane 810 and user plane 812.

The control plane 810 comprises policy module 806 that obtains and/or stores policy information relating to, for example, a subscriber of a UE 108. Policy module 806 may comprise means to request and receive policy information from other sources, for example from controller 114 as described above.

The user plane 812 comprises an interface 802 by which the L7 SDN 108 may communicate with other entities, for example with L2-L4 SDN 104 by communications channel 118c or control channel 128 as described above. Interface 802 may, for example, provide a means for signaling between the L7 SDN 108 and the L2-L4 SDN 104, and a routing means for receiving and routing data packets from and to L2-L4 SDN 104 as described above. The interface 802 may also provide means for L7 SDN to communicate with controller 114, for example as a means by which policy module 806 may request and receive policy information from controller 114 as described above.

The user plane 812 may also comprise orchestration module 804. Orchestration module 804 may be in communication with policy module 806 of the control plane 810 to request and receive policy information to, as described above, generate and implement various service chains on the basis of the policy information.

The user plane may also comprise routing function 814 for routing packets received at the L7 SDN 108 through various L7 Apps (e.g. L7 App 110a, L7 App 110b, and L7 App 110c) as defined by the service chain generated by the orchestration module 804. The L7 Apps (e.g. 110a-110c) may be run at the L7 SDN 108, and hence the routing function 814 may comprise internal circuitry of, for example, a server (not shown) on which the L7 SDN 108 is implemented. One or more of the L7 Apps (e.g. 110a-110c) may be located, for example, external to the server on which the L7 SDN 108 is implemented, and so routing function 814 may comprise one or more switches for routing data packets to L7 Apps located, for example, in the internet. The routing function 814 may also comprise a communication means for communicating with the L7 Apps, for example for registering the L7 Apps as described above, and for example receiving a communication from an L7 App that it has completed its service on a given data flow.

In an embodiment, at least one of the logical functionalities of L7 SDN 108, for example, orchestration module 804 of FIG. 7, may be performed by a computer that executes computer readable instructions, comprising, for example a processor, memory and a communications interface that are connected to each other via a bus. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer may execute computer readable instructions stored in the storage medium to implement various tasks as described above.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A communication network having a Software Defined Network (SDN) system comprising:
   a Layer 2 to Layer 4 SDN; and
   a Layer 7 SDN; wherein,
   the Layer 2 to Layer 4 SDN comprises one or more first network switches configurable to route data from a data flow through a selectable sequence of one or more entities defining a first service chain,
   wherein the entities defining the first service chain are selectable from one or more first SDN service applications and the Layer 7 SDN;
   wherein each of the one or more first SDN service applications is for performing a Layer 2, a Layer 3 or a Layer 4 service on data from the data flow,
   wherein the Layer 7 SDN comprises a routing function, the routing function comprising circuitry of a server on which the Layer 7 SDN is implemented, or comprising one or more second network switches, the circuitry or the one or more second network switches being configurable to route data from the data flow received at the Layer 7 SDN when the Layer 7 SDN is one of the entities in the first service chain through a second service chain comprising one or more second SDN service applications, and
   wherein each of the one or more second SDN service applications is for performing a Layer 7 service on data from the data flow.

2. The communication network of claim 1 wherein the Layer 7 SDN is arranged to send a signal to the Layer 2 to Layer 4 SDN to instruct the Layer 2 to Layer 4 SDN to remove the Layer 7 SDN from the first service chain when the Layer 7 SDN is one of the entities in the first service chain, so that mid-flow of data from the data flow through the first service chain, the first data flow is caused to by-pass the Layer 7 SDN.

3. The communication network of claim 2 wherein the Layer 7 SDN is arranged to send the signal to the Layer 2 to Layer 4 SDN in response to determining that all of the one or more second SDN service applications in the second service chain have completed their services for the data flow.

4. The communication network of claim 2 wherein the Layer 7 SDN is arranged to send the signal to the Layer 2 to Layer 4 SDN in response to determining that one or more resource usage criteria of the Layer 7 SDN have been met.

5. The communication network of claim 2 wherein the Layer 7 SDN is arranged to send the signal over an out of band control channel which is independent of the data flow.

6. The communication network of claim 2 wherein the Layer 7 SDN is arranged to send the signal over an in band control channel included in data of the data flow.

7. The communication network of claim 6 wherein the signal is encoded in one or more bits in at least one packet of data of the data flow.

8. The communication network of claim 1 wherein the Layer 7 SDN is arranged to select which of the one or more second SDN service applications to include in the second service chain based on information regarding the data flow provided to the Layer 7 SDN.

9. The communication network of claim 8 wherein the information identifies a user account and the Layer 7 SDN is arranged to select which of the one or more second SDN service applications to include in the second service chain based on a subscription plan associated with the user account.

10. A Layer 7 Software Defined Network (SDN) for use in a communication network, the Layer 7 SDN configured to:
 act as an entity in a first service chain of one or more entities through which a data flow is routable by one or more first network switches of a Layer 2 to Layer 4 SDN in the communication network,
 wherein the first service chain comprises one or more service applications each for performing a Layer 2, a Layer 3, or a Layer 4 service on data from the data flow,
 wherein the Layer 7 SDN comprises a routing function, the routing function comprising circuitry of a server on which the Layer 7 SDN is implemented, or comprising one or more second network switches, the circuitry or the one or more second network switches being configurable to route data from the data flow received at the Layer 7 SDN through a second service chain comprising one or more SDN service applications, and
 wherein at least one of the one or more SDN service applications of the second service chain is for performing a Layer 7 service on data from the data flow.

11. The Layer 7 SDN of claim 10, wherein the Layer 7 SDN is arranged to send a control signal to the Layer 2 to Layer 4 SDN to instruct the Layer 2 to Layer 4 SDN to remove the Layer 7 SDN from the first service chain when the Layer 7 SDN is one of the entities in the first service chain, so that mid-flow of data from the data flow through the first service chain, the first data flow is caused to by-pass the Layer 7 SDN.

12. The Layer 7 SDN system of claim 11, wherein the Layer 7 SDN is arranged to send the control signal to the Layer 2 to Layer 4 SDN in response to determining that all of the one or more SDN service applications in the second service chain have completed their services for the data flow.

13. The Layer 7 SDN of claim 11, wherein the Layer 7 SDN is arranged to send the control signal to the Layer 2 to Layer 4 SDN in response to determining that one or more resource usage criteria of the Layer 7 SDN have been met.

14. The Layer 7 SDN of claim 11 wherein the Layer 7 SDN is arranged to send the control signal over an out of band control channel which is independent of the data flow.

15. The Layer 7 SDN of claim 11 wherein the Layer 7 SDN is arranged to send the control signal over an in band control channel included in data of the data flow.

16. The Layer 7 SDN of claim 11 wherein the Layer 7 SDN is arranged to select which additional SDN service applications from a set of available SDN service applications to include in the second service chain, based on information regarding the data flow provided to the Layer 7 SDN.

17. The Layer 7 SDN system of claim 16 wherein the information identifies a user account and the Layer 7 SDN is arranged to select which SDN service applications to include in the second service chain based on a policy associated with that user account.

18. A non-transitory computer-readable storage medium comprising computer-executable instructions which, when executed by a processor, cause a computing device to perform a method of operating a Layer 7 Software Defined Network (SDN) in a communication network, the Layer 7 SDN comprising a routing function, the routing function comprising circuitry of a server on which the Layer 7 SDN is implemented, or comprising one or more second network switches, the method comprising:
 configuring the Layer 7 SDN to act as an entity in a first service chain of one or more entities through which a data flow is routable by one or more first network switches of a Layer 2 to Layer 4 SDN in the communication network, wherein the first service chain comprises one or more service applications each for performing a Layer 2, a Layer 3, or a Layer 4 service on data from the data flow; and
 configuring the circuitry or the one or more second network switches of the Layer 7 SDN to route data from the data flow received at the Layer 7 SDN through a second service chain comprising one or more SDN service applications, wherein at least one of the one or more SDN service applications of the second service chain is for performing a Layer 7 service on data from the data flow.

* * * * *